US 6,654,385 B1

(12) United States Patent
Odaka et al.

(10) Patent No.: US 6,654,385 B1
(45) Date of Patent: Nov. 25, 2003

(54) MESSAGE DIVISION COMMUNICATION METHOD AND COMMUNICATION SYSTEM

(75) Inventors: Hiromi Odaka, Kawasaki (JP); Sumie Morita, Kawasaki (JP); Shigeru Sekine, Kawasaki (JP); Eiji Ishioka, Kawasaki (JP); Hisashi Koga, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/362,169

(22) Filed: Jul. 27, 1999

(30) Foreign Application Priority Data

Jul. 27, 1998 (JP) ............................ 10-210676

(51) Int. Cl.$^7$ ................................................ H04J 3/16
(52) U.S. Cl. ................... 370/474; 370/232; 370/391; 370/470; 370/472; 370/476; 709/227; 709/250
(58) Field of Search ................ 370/232, 252, 370/391, 392, 394, 470, 471, 472, 474, 476, 468; 709/220, 227, 228, 233, 250; 714/708

(56) References Cited

U.S. PATENT DOCUMENTS 4,853,875 A * 8/1989 Brown ........................ 709/228
5,249,178 A * 9/1993 Kurano et al. ............... 370/392
5,535,221 A * 7/1996 Hijikata et al. .............. 370/471
6,307,867 B1 * 10/2001 Roobol et al. ............... 370/470
6,359,877 B1 * 3/2002 Rathonyi et al. ............ 370/349

FOREIGN PATENT DOCUMENTS

JP        1-258525      10/1989     ........... H04L/11/20
JP        5-56076       3/1993      ........... H04L/12/56

* cited by examiner

Primary Examiner—Dang Ton
Assistant Examiner—Shick Hom
(74) Attorney, Agent, or Firm—Katten Muchin Zavis Rosenman

(57) ABSTRACT

A message division communication method and system are disclosed for a communication system comprising a host, an intermediate device connected to the host through a high-speed bus and a remote device connected to the intermediate device or the host through a low-speed bus. A message is transmitted in such a manner that the host designates and notifies the remote device of a maximum message length determined in a way corresponding to the transmission rate of the low-speed bus and divides the message into division messages each not exceeding the maximum message length thereby to transmit and receive the division messages between the host and the remote device. Even with a communication system in which low-speed and high-speed buses coexist, a message can be transmitted and received by a common communication control scheme.

1 Claim, 9 Drawing Sheets

MESSAGE DIVISION COMMUNICATION METHOD AND COMMUNICATION SYSTEM

BACKGROUND OF THE INVENTION

1. Field of the Invention

The present invention relates to a message division communication method and a message division communication system for conducting transmission and receiving of messages in a communication system including a host, an intermediate device connected to the host through a high-speed bus, and a remote device connected to the host or the intermediate device through a low-speed bus.

2. Description of the Related Art

A communication system such as a switching system has a configuration for controlling a channel device or the like device by a host such as a central control unit for transmitting and receiving various messages between the host and the channel device to control the communication. In this communication system, a remote device may be connected through a low-speed bus. The transmission and receiving of messages to and from the remote device are also desirably carried out efficiently.

FIG. 1 is a schematic diagram for explaining the conventional communication system of this type. Reference numeral 61 designates a host such as a central control unit, numeral 62 an intermediate device such as a channel device, numeral 63 a remote device such as a remote line concentrator having a function equivalent to the channel device, numeral 64 a high-speed bus for executing a processor access control (PAC) communication protocol, and numeral 65 a low-speed bus for executing a LAPD (link access procedure on the D channel) or No. 7 protocol communication. The host 61 such as a central control unit and the intermediate device,62 such as a channel device are installed in the same office building, for example, and connected by a high-speed bus 64 such as a processor access control bus having a transmission rate of 20 Mbps, for example. Control commands and various messages such as status information are thus transmitted at high speed. The remote device 63 such as a remote line concentrator, on the other hand, is installed at a place remote from the host 61, and connected by a low-speed bus 65 such as LAPD or NO. 7 system bus having a transmission rate of 64 kbps, for example, for transmitting control commands and various messages such as status information.

In a signal error monitor of NO. 7 scheme, for example, the link is disconnected when a pulse train of all "1s" continues for 128 ms, for example. The maximum message length, therefore, is 273 bytes. Also, the maximum length is specified as 260 bytes for LAPD. In this way, the maximum message length for each protocol is determined to maintain the balance between the error monitor and the transmission rate. On the other hand, the message between the host 61 and the device 62 connected by a high-speed bus can be lengthened. The message length is shortened, however, between the host 61 and the remote device 63 which are connected by a low-speed bus through the intermediate device 62.

The device 62 such as a channel device connected to the host 61 such as a central control unit through the high-speed bus 64 has a function equivalent to that of the remote device 63 such as a remote line concentrator. Although the host 61 is connected to these devices of the same function, the maximum message length for transmission between the host 61 and the device 62 is different from that for transmission between the host 61 and the remote device 63 since they are connected to the host 61 through buses of different transmission rates.

Even in the case where a message as long as 4096 bytes can be transmitted through a high-speed bus of 20 Mbps, for example, the message length is limited to about 256 bytes when a low-speed bus of 64 kbps is used.

As described above, the host 61 is connected to the device 62 and the remote device 63 having the equivalent function through buses of different transmission rates. When transferring a large amount of messages such as the system setting information, therefore, different communication control schemes are required of the two different transmission routes. The resulting problem is a high cost required for program development and an increased processing burden imposed on the host 61.

SUMMARY OF THE INVENTION

The present invention has been developed in order to obviate the above-mentioned disadvantage of the conventional communication system, and the object thereof is to provide a novel communication method and communication system capable of transmitting and receiving messages by a common communication control scheme in a communication system including a host and a plurality of devices connected to the host through buses of different transmission rates.

According to a first aspect of the invention, there is provided a message division communication method used for transmitting and receiving messages in a communication system including a host, an intermediate device connected to the host through a high-speed bus and a remote device connected to the host through a low-speed bus, comprising the steps of the host designating and notifying the remote device of a maximum message length corresponding to the transmission rate of the low-speed bus, dividing the message into division messages each not exceeding the designated maximum message length, and transmitting and receiving the division messages between the host and the remove device.

As a result, the transmission of messages using a common communication scheme becomes possible in a communication system having both high-speed and low-speed buses therein.

Also, the division messages transmitted are reassembled into the original message in the host or the remote device.

Further, the maximum message length is designated from the host to the remote device according to the transmission rate of the low-speed bus by way of a device connected to the host through the high-speed bus.

In this way, an efficient message transmission is made possible even in a communication system having high-speed and low-speed buses in coexistence.

According to a second aspect of the invention, there is provided a communication system comprising a host, an intermediate device connected to the host through a high-speed bus, a remote device connected to the intermediate device or the host through a low-speed bus, wherein the host includes a communication control unit for notifying the remote device of the maximum message length determined in a way corresponding to the transmission rate of the low-speed bus and transmitting the division messages of the message to the remote device in a length not exceeding the maximum message length, and wherein the remote device includes a communication control unit for receiving and reassembling division messages from the host thereby to receive the mess age from the host and send a message to the host in division messages each not exceeding the maximum message length designated by the host.

Thus, a message is transmitted without being divided between devices connected by a high-speed bus, and can be transmitted by being divided between devices connected by a low-speed bus. As a result, a message can be transmitted and received efficiently using a common communication control scheme in a communication system comprising devices of different communication rates.

DESCRIPTION OF THE PREFERRED EMBODIMENTS

Figure 1:
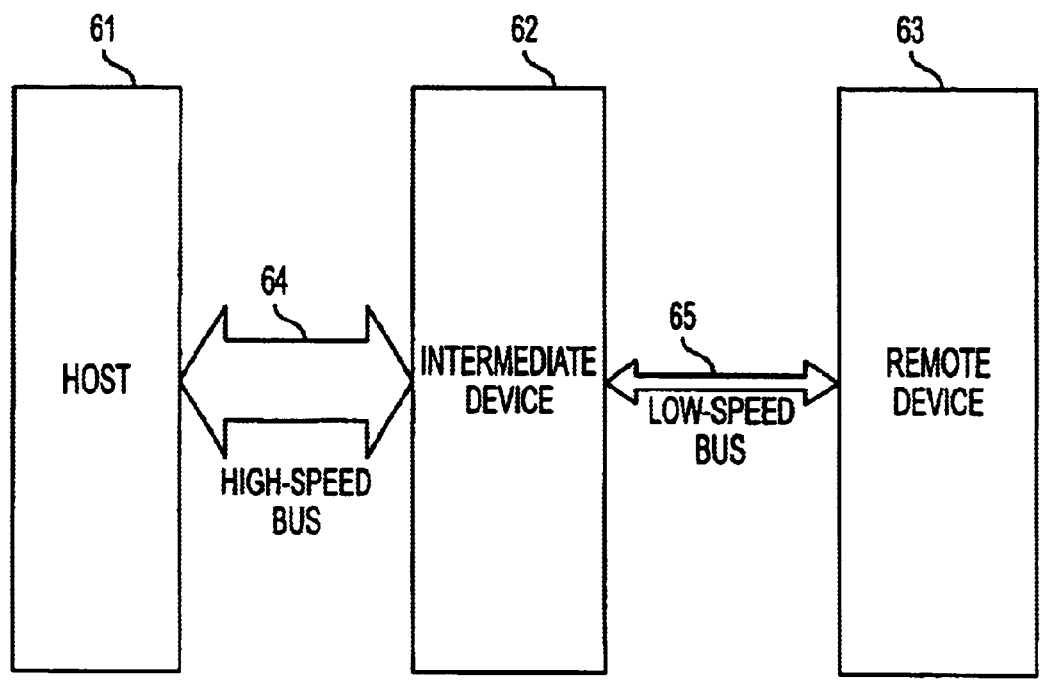
FIG. 1 is a schematic diagram for explaining a conventional communication system.
Figure 2:
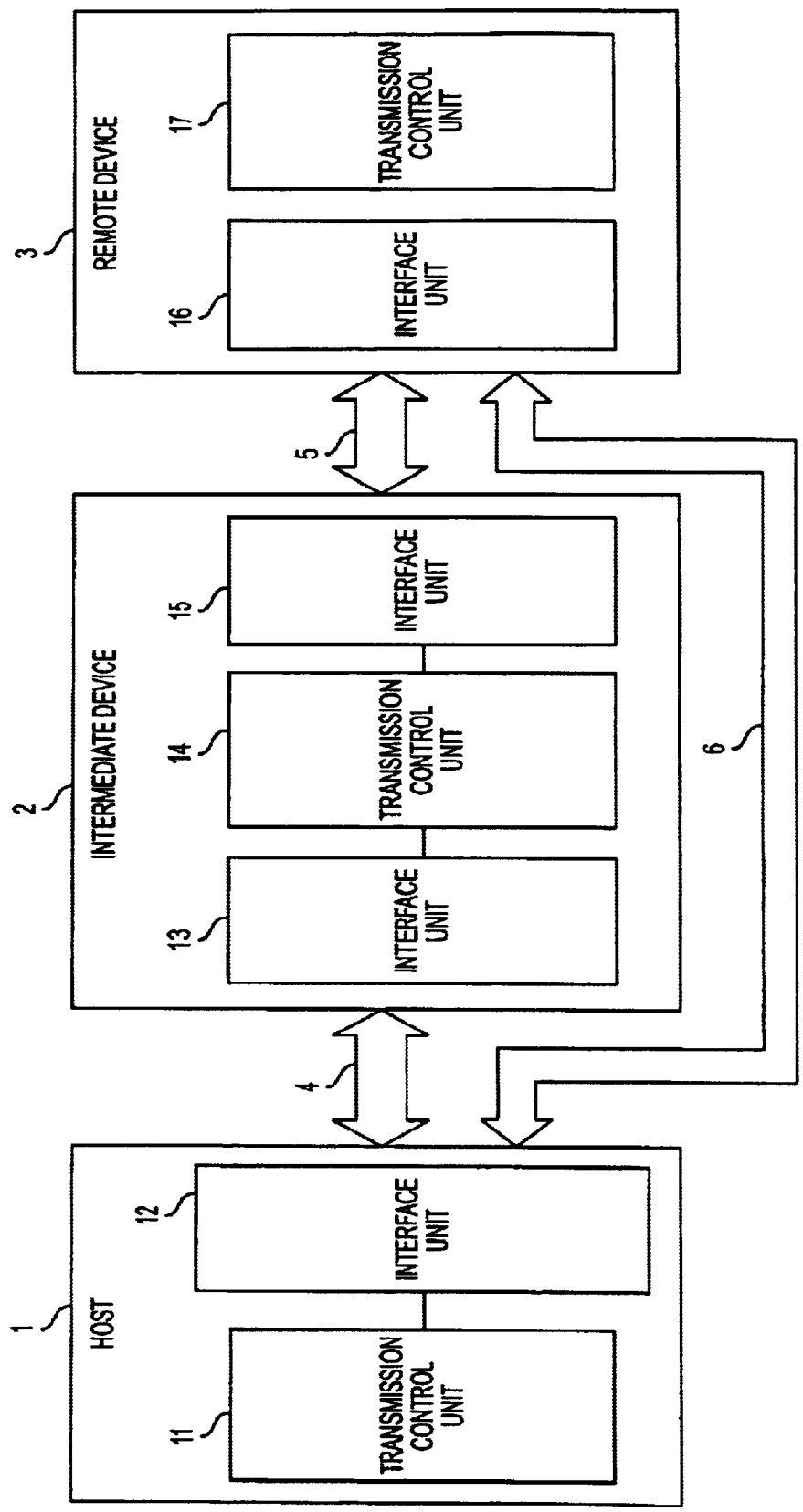
FIG. 2 is a schematic diagram for explaining a communication system according to an embodiment of the invention.

FIG. 2 is a diagram for explaining a communication system according to a first embodiment of the present invention. Numeral 1 designates a host such as a central control unit, numeral 2 an intermediate device such as a channel device, numeral 3 a remote device such as a remote line concentrator, numeral 4 a high-speed bus, numerals 5, 6 low-speed buses, numerals 11, 14, 17 transmission control units, and numerals 12, 13, 15, 16 interface units.

The interface unit 12 of the host 1 such as the central control unit and the interface unit 13 of the device 2 such as the channel device are connected by the high-speed bus 4. The interface unit 16 of the remote device 3 such as the remote line concentrator is connected with the interface unit 15 of the device 2 or with the interface unit 12 of the host 1 by the low-speed buses 5, 6, thereby constituting a communication system including buses of different transmission rates.

The transmission control unit 11 of the host 1 recognizes the device 2 connected through the interface unit 12, the remote device 3, and the transmission rate of the high-speed bus 4 and the, low-speed buses 5, 6. Therefore, the transmission control unit 11 can transmit and receive a message to and from the transmission control unit 14 of, the device 2 at high speed through the high-speed bus 4 with a maximum mess age length of 4096 bytes, for example, as in the prior art.

In transmitting a message between the host 1 and the remote device 3 through the low-speed bus 5 or 6, the host 1 notifies, from the transmission control unit 11 thereof, the remote device 3 of the maximum message length corresponding to the transmission rate of the low-speed bus 5 or 6 through the interface unit 12. In the case where a message is sent through the low-speed bus 5, i.e. in the case here a message is transmitted between the host 1 and the remote device 3 through the device 2, the device 2 transmits by relay the designation of the maximum message length from the host 1 through the, interface units 13, 15 and the transmission unit 14.

The remote device 3, upon receipt of the designation of the maximum message length from the host 1, has the transmission control unit 17 divide the message to be transmitted not to exceed the maximum message length. The resulting division messages are sent out to the host 1. The transmission control unit 11 of the host 1 reassembles the division messages.

Also in the remote device 3, the division messages sent from the host 1 in a manner not to exceed the maximum message length are reassembled by the transmission control unit 17. As a result, the host 1 recognizes the other party in the device 2 or the remote device 3. Thus, the host 1 can communicate a message with the remote device 3 connected through the low-speed buses 5, 6 in the same manner as with the device 2 by designating the maximum message length.

Figure 3:
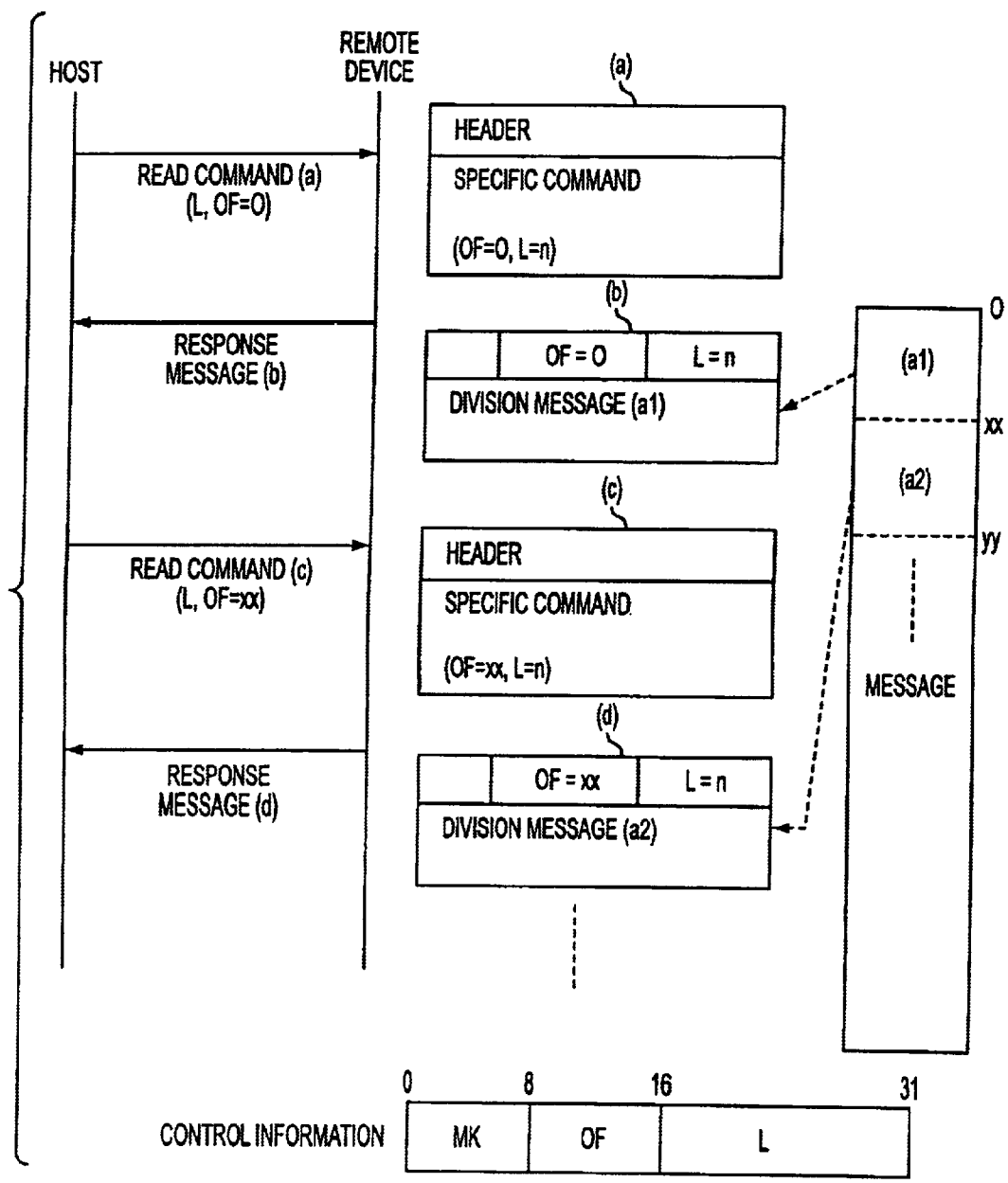
FIG. 3 is a diagram for explaining the operation sequence of a message division communication method according to a second embodiment of the invention.

FIG. 3 is a diagram for explaining the operation sequence of a communication method according to a second embodiment of the invention. Reference is made to the case in which a message is transmitted between the host 1 such as the central control unit and the remote device 3 such as a remote line concentrator. The host 1, when collecting various information of the remote device 3, sends out a read command (a) including the maximum message length L and the offset OF to the remote device 3 through the low-speed bus 6. The read command (a), as indicated by (a) in the right portion of FIG. 3, designates the offset OF=0 and the maximum message length=n. This designation can be added to the contents or the header of the command The transmission control unit 17 of the remote device 3 (FIG. 2) sends out a response message (b) to the read command (a). This response message (b) has the header thereof containing the offset OF=0 and the maximum message length L=n added to the read command (a) and includes a division message (a1) constituting one of a plurality of division messages obtained by dividing the original message not to exceed the maximum message length. The division message (a1) is the first one of division messages 0 to (xx−1), xx to (yy−1) and so forth.

The host 1 that has received the response message (b) has the transmission control unit 11 thereof determine whet her the message has been normally received or not. In the case of normal receipt, the next read command (c) is sent out.

The read command (c), which is similar to the first read command (a), is sent with the offset OF updated to xx, for example, in a way corresponding to the byte length 0 to (xx−1) of the division message (a1). In this case, the window size for transmitting the division messages is assumed to be 1.

The transmission control unit 17 of the remote device 3 adds to the header the offset OF=xx and the maximum message length L=n attached to the received read command (c), while at the same time generating and sending out the response message (d) including the corresponding division message (a2). In the normal receive operation, the host 1 that has received this response message (d), as in the preceding case, sends out the next read command and repeats the above-mentioned process until the message to be sent out in response to the read command is depleted. As a result, the host 1 can acquire the message by the process similar to that of the read command issued to the device 2, by designating the maximum length of the response message corresponding to the read command.

As for the control information added to the header and the like, the mark MK, the offset OF and the maximum message length L can be included as shown in the lower part of the drawing. This mark MK is set to 0 in the standard case where the message division is not required, to 1 for the first division message in transmitting the division messages, to 3 for the last division message, and to 2 for the division messages therebetween.

In reassembling the message at the receiving end, therefore, the head and tail of the division message are identified by the mark MK=1 and the mark MK=3, respectively, and the order in which the division messages are received can be identified by the offset OF. The division messages can thus be positively reassembled. The mark MK for identifying the order in which the division messages are received can be done without, or the mark MK can be used in place of the offset OF.

Figure 4:
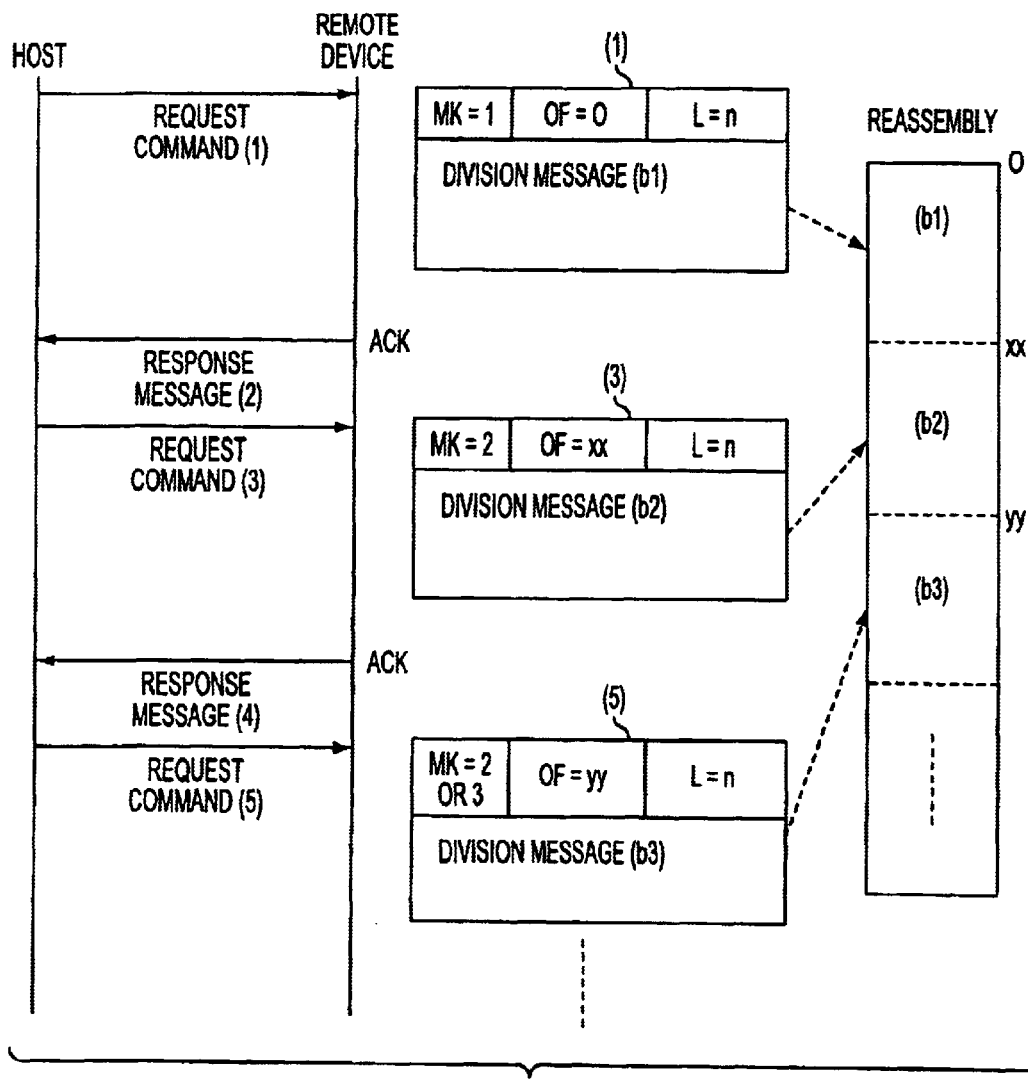
FIG. 4 is a diagram for explaining the operation sequence of a message division communication method according to a third embodiment of the invention.

FIG. 4 is a diagram for explaining the operation sequence of a communication method according to a third embodiment of the invention. This refers to the case in which a message such as the setting information is sent as a division message from the host 1 such as a central control unit to the remote device 3 such as a remote line concentrator through the low-speed bus 3.

First, a request command (1) from the host 1 is sent out to the remote device 3. This request command (1) includes the mark MK, the offset OF and the maximum message length L in the header, and also includes a division message (b1) of a length not exceeding the maximum message length L. Being the first division message, the mark, the offset and the maximum message length in the header are set to MK=1, OF=0 and L=n, respectively.

This request command is used, for example, in the case where various types of setting information of the remote device 3 are collectively transferred and set. Since it contains a multiplicity of setting information, the whole message length is increased. In view of this, the host which recognizes the transmission rate to the remote device 3, divides the message in such a manner as not to exceed the maximum message length L corresponding to the transmission rate, generates a plurality of division messages (b1), (b2), (b3) . . . each of which has a header added thereto and is sent out.

The transmission control unit 17 of the remote device 3 sends out a response message (2) indicating ACK to the host 1 in the case of normal receipt. Upon receipt of the response message (2), the host 1 sends out the request command (3) including the next division message (b2). The division message (b2) included in this request command (3) is the second one but not the last one. Therefore, MK is set to 2. If the number of bytes of the first division message (b1) is xx, for example, OF is set to xx, and for other than special cases, the maximum message length L is set to L=n as in the preceding case, and the header including this information is sent out.

In normal receipt, the transmission control unit 17 of the remote device 3 sends out the response message (4). indicating the acknowledgment ACK as in the preceding case. Then the host, 1 sends out the next request command (5). This request command (5) is also set to MK=2 unless it, is the last one, and in the case of the last one, it is set to MK=3.

The offset OF sequentially increases, so that the header with OF=yy and the division message (b3) are sent out, for example.

The transmission control unit 17 of the remote device 3 that has received the division messages (b1), (b2), (b3), . . . reassembles the message by referring to the mark MK and the offset OF in the header. In the case where these messages include the setting information, each part is set according to the setting information.

Figure 5:
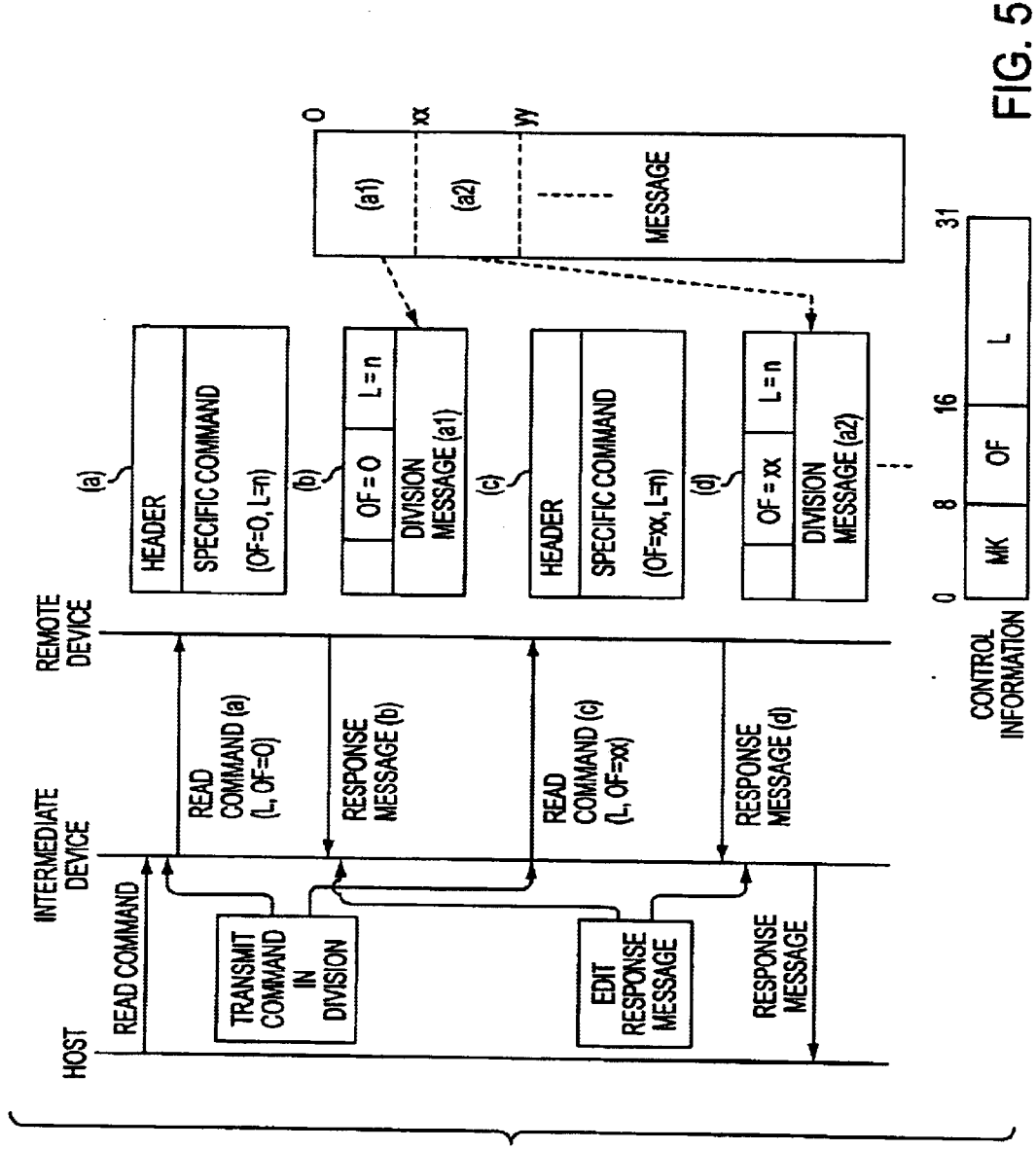
FIG. 5 is a diagram for explaining the operation sequence of a message division communication method according to a fourth embodiment of the invention.
Figure 6A:
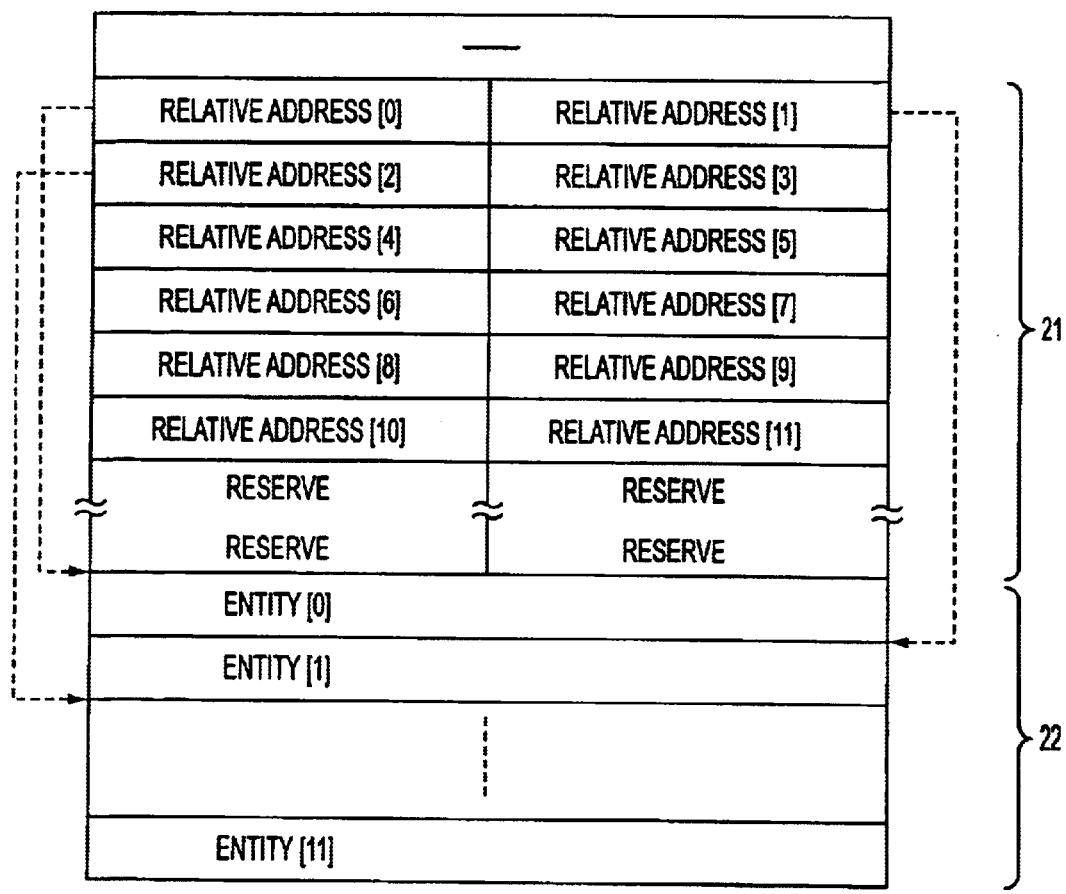
FIGS. 6(A), 6(B), 6(C) and 6(D) are diagrams showing a method of dividing a message usable in a message division communication method according to each embodiment of the invention.
Figure 6D:
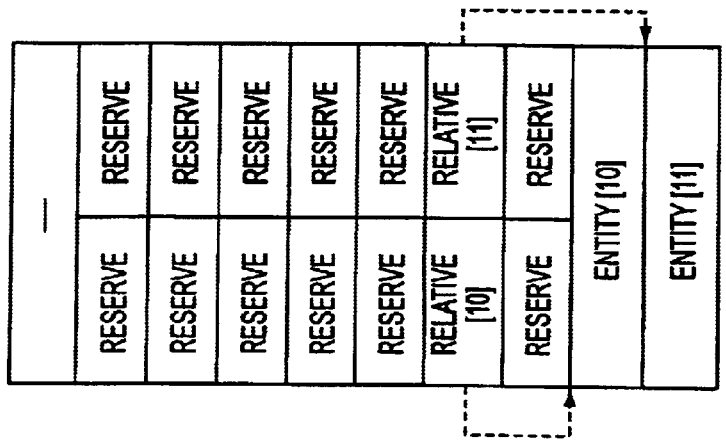
Figure 6C:
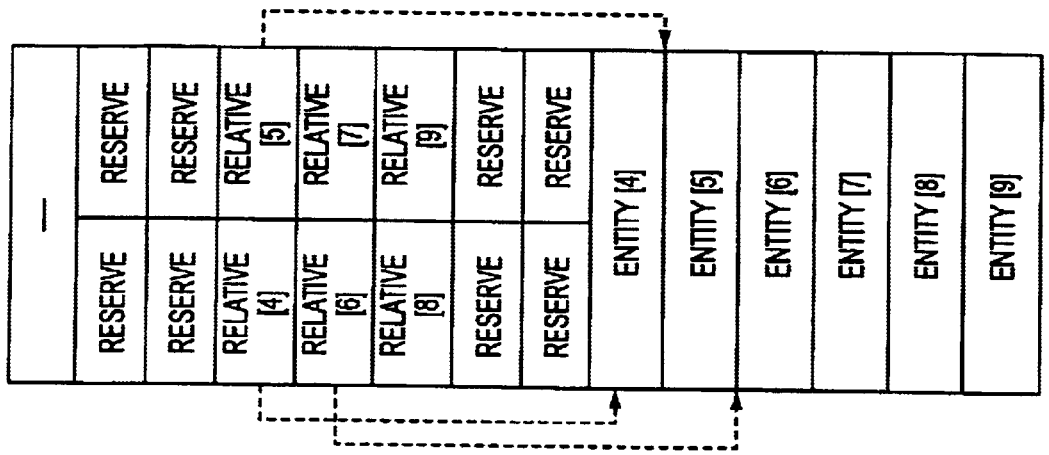
Figure 6B:
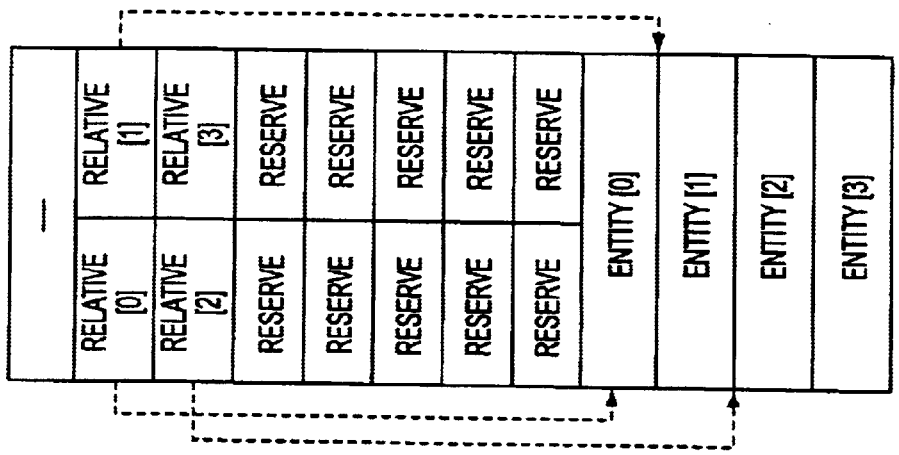

FIG. 5 is a diagram for explaining the operation sequence of a communication method according to a fourth embodiment of the invention. This refers to the case in which the host 1 such as the central control unit collects various information from the remote device 3 such as the remote line concentrator through the device 2 such as the channel device. The host 1 and the device 2 are connected through the high-speed bus 4, and therefore the read command from the host 1 is transmitted as it is to the device 2.

In accordance with an instruction from the host 1, the communication control unit 14 of the device 2 recognizes that the destination of the read; command received is the remote device 3 connected through the low-speed bus 5, and based on the read command sent from the host 1, sends out the read command (a) including the maximum message length L that can be transmitted through the low-speed bus 5 and the offset OF to the remote device 3. This read command (a), as indicated by (a) to the right in the drawing, designates the offset OF=0 and the maximum message length L=n. This designation can be added to the contents of the command or the header.

The transmission control unit 17 (FIG. 2) of the remote device 3 sends out the response message (b) in response to the read command (a). This response command (b) has the header thereof with the offset OF=0 and the maximum message length L=n attached to the read command (a), and includes a division message (a1) among a plurality of division messages into which the message is divided in order that the maximum message length may not be exceeded. This division message (a1) is the first one of a plurality of messages 0 to (xx−1), xx to (yy−1), and so forth into which the original message is divided.

The device 2 that has received this response message (b) determines in the transmission control unit 14 thereof whether it is a normal receipt or not, and in the case of normal receipt, sends out the next command (c) while at the same time starting to edit the received response message (b).

The read command (c) is similar to the first read command (a), except that it is sent out after being updated to the offset OF=xx corresponding to the byte length (0 to (xx−1)), for example, of the divisions message (a1). In this case, the window size is assumed to be 1 for transmission of the division message.

In the transmission control unit 17 of the remote device 3, the offset OF=xx and the maximum message length L=n added to the received read command (c) are added to the header. At the same time the response message (d) including the division message (a2) generated by the division to the read command is generated and sent out. The device 2 that has received this response message (d), as in the preceding case, sends out the next read command in the case of normal receipt, and the above-mentioned process is repeated until the messages are depleted to be sent out in response to the read command. The device 2 also receives the response message from the remote device 3, edits the response message and reassembles the division messages.

In this way, the division messages of the remote device 3 are collected in the device 2 and reassembled into the original message. Then the resulting message is transmitted as a response message from the device 2 to the host 1 through the high-speed bus 4.

The control information added to the header of the read command (a) divided and transmitted from the device 2 to the remote device 3, like in the embodiment of FIG. 3 or 4, can include the mark MK, the off set OF and the maximum message length L.

FIGS. 6(A), 6(B), 6(C) and 6(D) are diagrams for explaining a method of dividing a message applicable to each of the above-mentioned embodiments of the invention. As shown, the message (A) includes a relative address section 21 and an entity section 22. The relative address section 21 includes relative addresses [0] to [m] in the number corresponding to the standard maximum message length. The entity section in which the message is divided according to a predetermined length, on the other hand, corresponds to each relative address. The reserve of the relative address section 21 indicates the absence of the entity (unit message) corresponding to the relative address for the particular reserve.

Thus, the entities [0] to [11] into which the whole message is divided are set in a manner corresponding to the relative addresses [0] to [11]. In the case where the maximum message length corresponds to six entities, for example, the message is divided as shown in (B), (C) and (D). Specifically, the division message (B) includes four unit messages based on the entities [0] to [3] corresponding to the relative addresses [0] to [3], which constitutes division messages fewer by two entities than the maximum message length. The division message (C), on the other hand, includes six unit messages based on the—entities [4] to [9] corresponding to the relative. addresses [4] to [9] and constitute a division message including as many entities as the maximum message length L. The division message (D) includes two unit messages based on the entities [10], [11] corresponding to the relative addresses [10], [11] and constitutes a division message fewer by four entities than the maximum message length. In the absence of the corresponding entity, the relative address is considered to be reserved. Nevertheless, the entities are advanced not to form any reserve.

At the receiving end that has received the division messages, the entities [0] to [11] are easily reassembled into the original message (A) as shown by (B)+(C)+(D) by reference to the relative addresses. In the case where the entities [0] to [11], individually or by combination, indicate the significant control information, it is possible at the receiving end to process the unit messages each time it receives each of the entities [0] to [11] before receiving and reassembling the whole.

Figure 7:
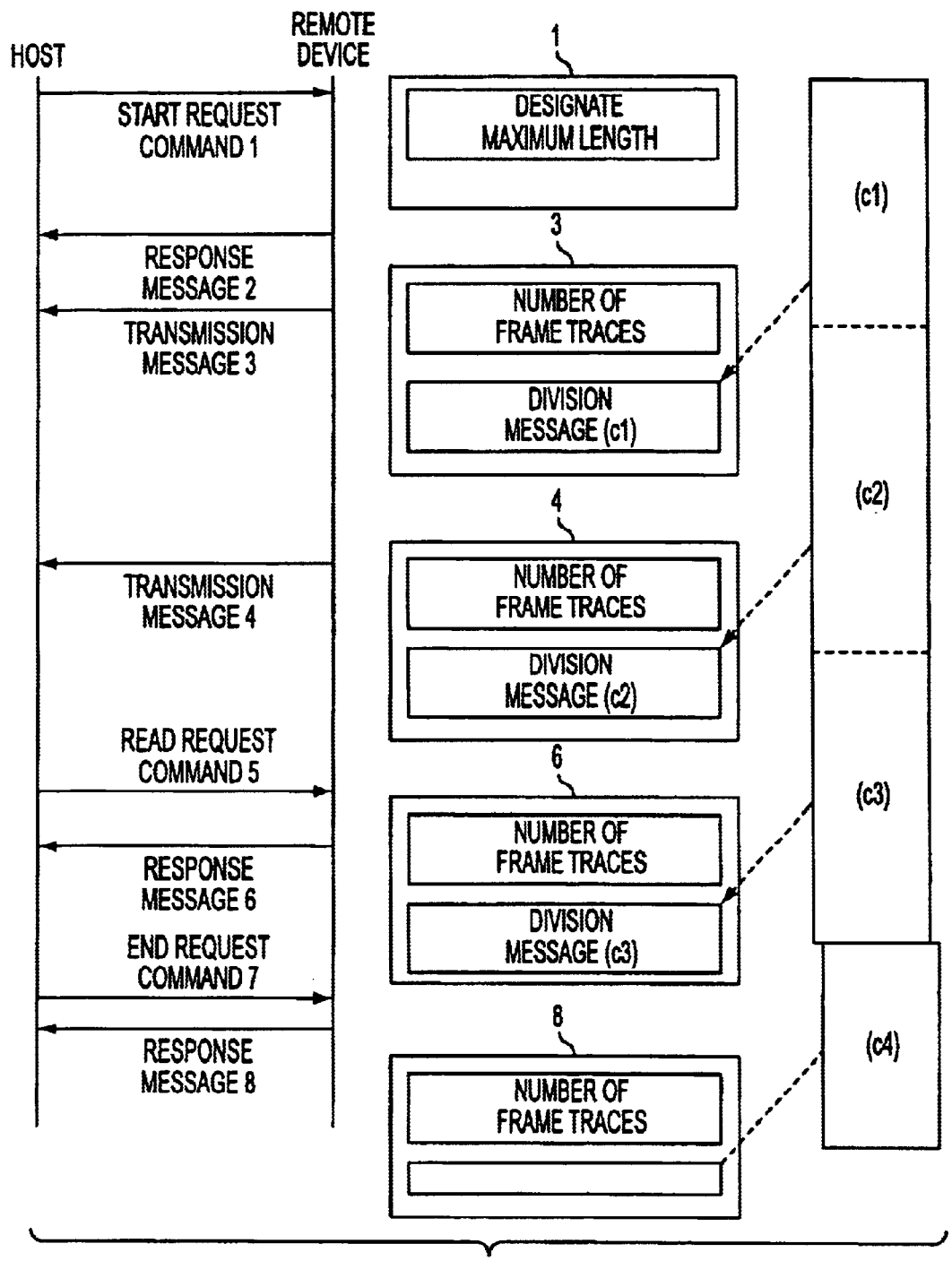
FIG. 7 is a diagram for explaining the operation sequence of a message division communication method according to a fifth embodiment of the invention.

FIG. 7 is a diagram for explaining the operation sequence of a fourth embodiment of the invention. This embodiment refers to the case in which the frame trace information in the remote device 3 is sent out autonomously as a division message to the host 1. In the remote device 3, the various control signals based on the common channel signaling system or the like are accumulated by the frame trace. When the accumulated information exceeds a predetermined amount, it is sent out to the host 1 autonomously. In such case, a start request command ① permitting autonomous transmission is sent out from the host 1 to the remote device 3. The maximum message length is designated to the remote device 3 by the start request command ① in the same manner as in the embodiments described above.

The remote device 3 sends out a response message ② in response to the start request command ①, and after that, when the information collected by the frame trace reaches a predetermined amount, the division messages (c1), (c2), (c3) and so forth are generated not to exceed the maximum message length. Thus the division message (c1) with the number of frame traces added thereto is sent out as a transmission message ③. Then, the division message with the number of frame traces added thereto is sent out as a transmission message ④. In similar fashion, an autonomous transmission message corresponding to the data amount collected by the frame trace is transmitted to the host 1. Since the transmission is autonomous, the message is transmitted as a division message and no response message is received from the host 1.

In the case where the read request command ⑤ for the frame trace information is sent out from the host 1, the remote device 3 transmits the response message ⑥ constituted of the collected frame trace information as a division message (c3) not exceeding the maximum message length. In the case where the end request command ⑦ for the read request of the frame trace information is sent out from the host 1, on the other hand, the remote device 3, in the presence of the collected frame trace information, sends out the response message ⑧ including the division message (c4) and the number of frame traces The host 1 identifies the faulty points by use of the frame trace information. Even in the case where the read request is sent by the host 1 after the instruction from the host 1 to start the autonomous transmission, therefore, the division message can be transmitted and received in accordance with the sequence shown in FIG. 3.

Figure 8:
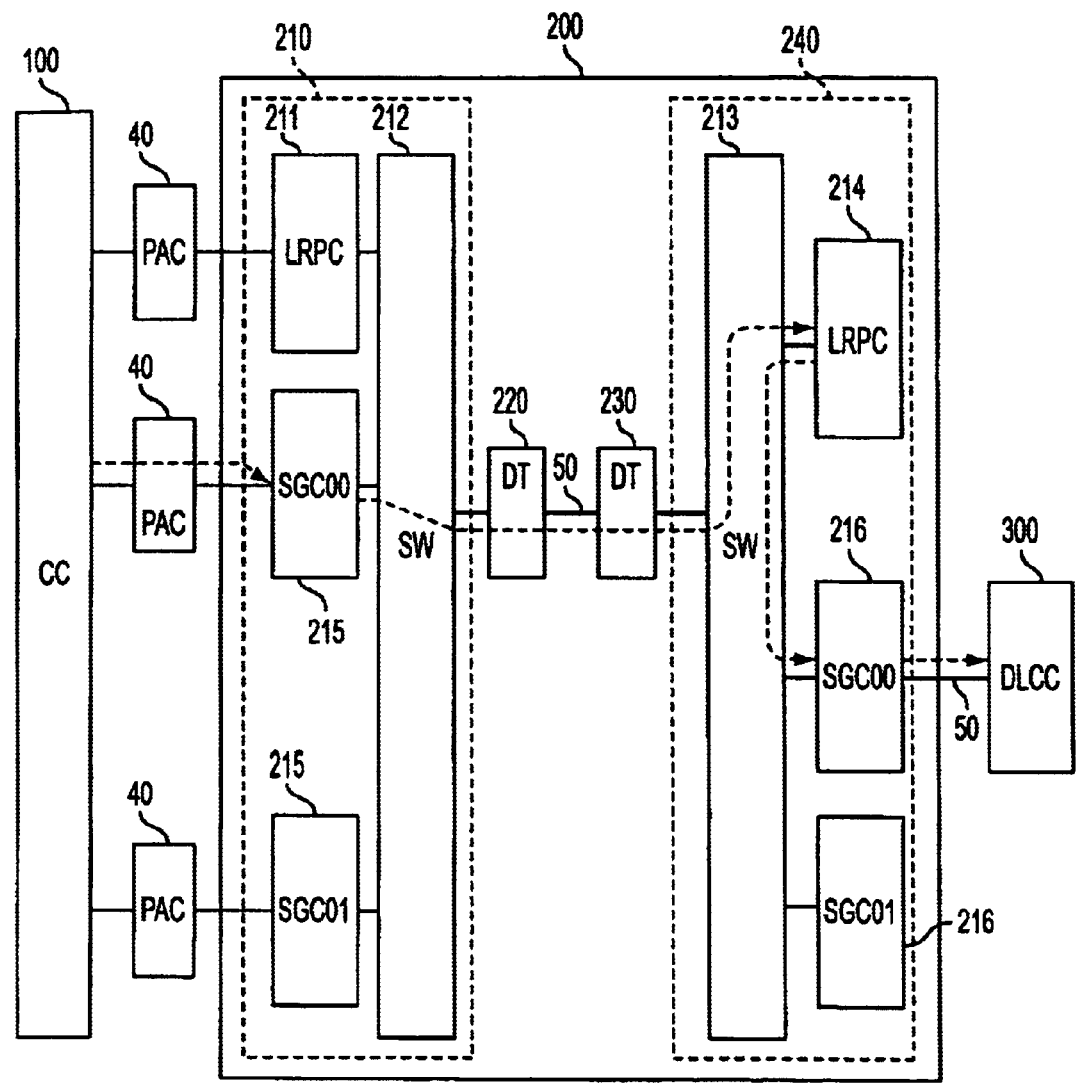
FIG. 8 is a block, diagram showing a communication system according to a sixth embodiment of the invention.

FIG. 8 is a diagram for explaining the configuration of a communication system according to a sixth embodiment of the invention. In FIG. 8, numeral 100 designates a central control unit (CC) corresponding to the host of FIG. 2, and numeral 200 a channel device corresponding to the device 2 of FIG. 2 including a switch control shelf 210, digital terminals 220, 230 , and a signal control shelf 240. Numeral 300 designates a digital line circuit (DLCC) corresponding to the remote device 3 of FIG. 2.

In the switch control shelf 210 and the signal control shelf 240, the LRPCs 211 and 214 constitute a path control unit (line register signal and path control), and numerals 212, 213 designate a switching network (SW). Also, numerals 215, 216 designate signaling controllers (SGC00, SGC01 . . . ).

In this communication system, the central control unit 100 and the channel device 200 are connected by a processor access controller (PAC) 40 constituting a high-speed bus. Also, the channel device 200 and the digital line circuit 300 are connected through a No. 7 signal line 50 constituting a low-speed bus.

In the communication system described above, the central control unit 100 recognizes the channel device 200, the digital line circuit 300 and the transmission rate of the communication bus between them. In the case where a control message is transferred from the central control unit 100 through the device 200 to the digital line circuit 300, therefore, the high-speed communication is established between the central control unit 100 and the device 200 by the communication protocol based on PAC 40.

The central control unit 100 recognizes that the destination of the control message is the digital line circuit 300, and therefore notifies the path control unit 211 of the device 200 oft the maximum message length that can be transmitted by the low-speed bus. In compliance with this notification, the path control unit 211 instructs the signaling controller 215 to divide the message. The controller 215 thus sends out the divided control messages to the digital terminal 220 through the switching network 212.

Also, the control unit 211, informed that the destination of the control message is the digital line circuit 300, sets a path indicated by dotted line in the drawing. As a result, a low-capacity path is established from the signal line controller 215 to the digital terminals 220, 230 to the path control unit 214 to the signaling controller 216 to the digital line circuit 300.

The message communication based on the No. 7 communication protocol is carried out in the circuit including the signaling controller 215, the digital terminals 220, 230 and the path control unit 214. The message is, transferred by the low capacity simple bus communication between the path control unit 214 and the signaling controller 44, and by the No. 7 communication protocol again between the signaling controller 44 and the digital line circuit 300.

Even in the case where the No. 7 signal line corresponding to the low-speed bus and the high-speed bus 40 coexist in this way, the central control unit 100 can transfer the message efficiently by a common communication control scheme.

It will thus be understood from the foregoing description that according to the present invention, there is provided a communication system having buses of different transmission rates, in which the host 1 such as the central control unit is connected with the device 2 such as the channel device by the high-speed bus 4, and with the remote device 3 such as the remote line concentrator by the low-speed buses 5, 6. When the message communication is carried out in this communication system, the host 1 designates and notifies the remote device 3 of the maximum message length corresponding to the transmission rate of the low-speed bus, so that the host 1 and the remote device 3 divides the message in a manner not to exceed the maximum message length. The resulting divided messages are transmitted and received.

This permits the host 1 to carry out the message communication by a communication sharing scheme similar to the device 2 connected thereto by a high-speed bus. In other words, the invention has the advantage that whether a message is to be divided or not is designated in accordance with the transmission rate, and thus the message communication through the high-speed bus 4 and the message communication through the low-speed buses 5, 6 can be carried out by a common control scheme.

What is claimed is:

1. In a communication system comprising a host, an intermediate device connected to the host through a high-speed bus, and a remote device connected to a selected one of said intermediate device and said host through a low-speed bus, a message division communication method for transmitting a method, comprising the steps of:

designating and notifying from said host to said remote device of a maximum message length determined in a way corresponding to the transmission rate of said low-speed bus; and dividing said message in a manner not to exceed the maximum message length designated into a plurality of division messages, and transmitting the plurality of division messages between said host and said remote device;

wherein said message includes a relative address section having a plurality of relative addresses and an entity section including a plurality of entities corresponding to said relative addresses, respectively, and wherein said message is transmitted by being divided into one of a plurality of entities corresponding to one of a plurality of relative addresses selected in the order defined in said relative address section in a manner not to exceed said maximum message length.

* * * * *